United States Patent [19]

Mariani

[11] Patent Number: 4,473,952

[45] Date of Patent: Oct. 2, 1984

[54] TWO DIRECTIONAL MEASURING DEVICES

[75] Inventor: Renato Mariani, Nepean, Canada

[73] Assignee: Northern Telecom Limited, Montreal, Canada

[21] Appl. No.: 450,429

[22] Filed: Dec. 16, 1982

[51] Int. Cl.³ .............................. G01B 5/12; G01B 5/18

[52] U.S. Cl. ................................. 33/169 B; 33/169 R; 33/178 B

[58] Field of Search ............. 33/169 R, 143 R, 168 R, 33/169 B, 174 E, 178 R, 178 B, 174 F

[56] References Cited

U.S. PATENT DOCUMENTS 4,219,937 9/1980 Lorenzini ....................... 33/178 B 4,342,153 8/1982 Cole ................................. 33/174 E Primary Examiner—Willis Little
Attorney, Agent, or Firm—R. J. Austin

[57] ABSTRACT

Two directional measuring device having an elongate measuring member having a distance measuring scale along its length and another measuring member to measure distance in another direction. The two members are relatively moveable in the direction of the measuring scale of the elongate member and the other member has diverging surfaces extending generally in that direction and a distance measuring scale to indicate, at spaced positions, the distance apart of the diverging surfaces.

6 Claims, 6 Drawing Figures

TWO DIRECTIONAL MEASURING DEVICES

This invention relates to two directional measuring devices.

Because of internal stresses, ground movement and external forces, concrete walls are known to crack. Cracking may be only superficial and therefore not affect the strength or integrity of the walls or it may be of substantial depth, in which case it may have a great weakening effect upon the wall strength and stability. It is of particular concern when manholes have their walls constructed from concrete.

Such manholes may be used for the purpose of housing underground electrical or telecommunications cables or for other uses. The walls of manholes are normally metal reinforced, by a metal reinforcement provided a few inches beneath the concrete surface. Any cracks appearing in walls of manholes are a visible indication of damage, but the outside appearance of these cracks cannot be taken as a clear indication of the true seriousness of the actual damage to the wall. For instance, a narrow and relatively harmless looking crack may be deep and extend to the metal reinforcement and when this occurs, rusting of the metal may result followed by sudden disintegration of the wall. Where the wall of a manhole has deteriorated badly through structural defects and cracking, it is most likely to disintegrate and collapse when sudden loads are applied to it, such as when a truck is disposed directly above it during maintenance or installation of cables at the bottom of the manhole. Of course under such circumstances there is likely to be a cable installer or repairman located at the bottom of the manhole. A wall collapse in a manhole under the circumstances could be extremely dangerous, if not fatal.

In an attempt to judge accurately, any structural damage in a manhole wall when a crack becomes visible, various designs of test equipment have been built and used. One type of known equipment is an ultrasonics test equipment and another includes a hammer device. In both types of equipment, a measuring head or hammer is applied to the concrete wall in the region of a crack and signals obtained are intended to give an indication of the crack depth and internal state of the concrete. However, it has been realized that while such equipment is expensive, the accuracy of its readings is extremely suspect and a structural engineer cannot rely on making a proper judgement on the soundness of a wall based on such readings. Apart from this, existing equipment is awkward to carry and to use.

It would be advantageous to be able to provide a means for more accurately measuring the width and particularly the depth of a crack in a concrete wall. It would also be an advantage if such means were more economic to produce than known existing equipment.

According to the present invention, a two directional measuring device is provided which comprises an elongate measuring member having a distance measuring scale provided along its length for distance measurement in one direction and another measuring member for distance measurement in another direction, the two members being relatively moveable in said one direction, and the other member having diverging surfaces extending generally in the direction of the length of the elongate member, said other member having a distance measuring scale to indicate, at spaced positions, the distance apart of the diverging surfaces at each of the spaced positions.

The above device according to the invention is structurally simple and inexpensive while allowing measurements to be taken of the depth of a crack in concrete and of its width. The elongate member measures the depth and the other member is moved along the elongate member and into the crack until its diverging surfaces contact the opposite sides of the crack. The distance measuring scale on the other member then indicates the width of the crack, i.e. the position of the diverging surfaces at which the sides of the crack contact these surfaces.

It is convenient for the elongate member to be flexible to enable it to be urged to the base of a crack of non-linear shape. For this purpose, it is preferable to form the elongate member as a flat strip. Flexibility of the strip is assisted if a slot is provided longitudinally of the strip and such a slot conveniently may receive mounting means for enabling the other member to be mounted upon the strip.

One embodiment of the invention will now be described, by way of example, with reference to the accompanying drawings, in which.

Figure 1:
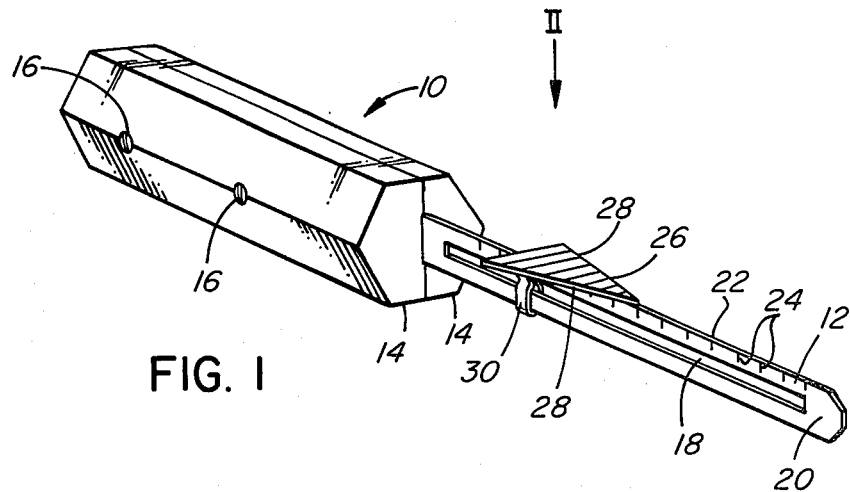
FIG. 1 is an isometric view of a two directional measuring device.

A two directional measuring device 10 for measuring the depth and width of cracks in concrete walls of a manhole comprises an elongate measuring member in the form of a flat strip 12. This strip is held at one end by being sandwiched between two halves 14 of a handle (FIG.1) which are secured together by screws 16. The strip 12 is of flexible nature and this flexibility is assisted not only by its material which may be a suitable plastic or metal, but also by the provision of a longitudinally extending slot 18 which terminates close to the free end 20 of the strip. The length of the strip projecting from the handle may be around 150 mm, its width about 12 mms with a 4 mm width slot, and the strip thickness is about 0.5 mm less.

The strip is formed along one edge 22 with a distance measuring scale 24, which may for instance be in millimeter units.

Figure 2:
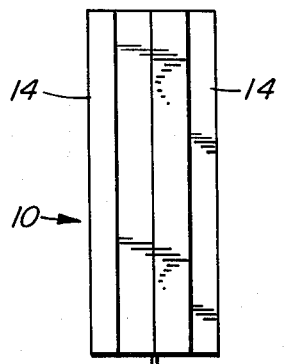
FIG. 2 is a side elevational view of the device taken in the direction of arrow II in FIG. 1.

The device is provided with another measuring member 26. This member as shown by FIGS. 1 and 2 is planar and is in the shape of an isosceles triangle. The member 26 is slidably held to move along the side edge 22 of the strip 12, symmetrically with regard to the plane of the strip and with side edges 28 of member 26 diverging as they extend away from the free end 20.

Figure 3:
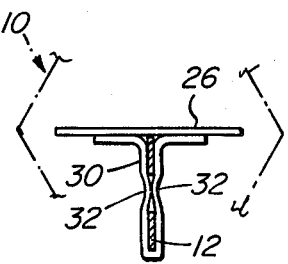
FIG. 3 is a cross-sectional view, on a larger scale, of the device taken along line III—III in FIG 2.

Mounting means is provided for slidably mounting the member 26. This mounting means comprises a metal or plastic strip 30 (FIG. 3) which extends around the strip 12 with its ends bonded or otherwise secured to member 26. To provide a slight resistance to movement, the strip 30 resiliently grips the strip 12 and small arcuate portions 32 of strip 30 enter the slot 18 to improve the grip. Hence the member 26 may be moved to any location along the strip 12 and remains in that location by virtue of the grip afforded by strip 30.

Figure 6:
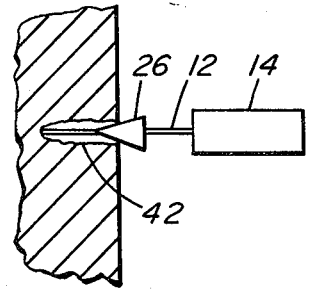
FIG. 6 is a view similar to FIG. 3 of a modification to the embodiment.

In a modification of the latter feature as shown by FIG. 6, flanges 34 of the member 26 extend one on each side of strip 12 and a screw 36 and captive nut 38 apply sufficient pressure to produce the frictional grip of the flanges upon the strip.

The member 26 is provided with a distance measuring scale for measuring in a direction different from that of the scale 24. The scale of member 26 is formed by a plurality of parallel lines 40 produced upon the outwardly facing surface of the member, these lines indicating, at spaced positions along the member, the distance apart of the side edges 28 at each of these positions.

Figure 4:
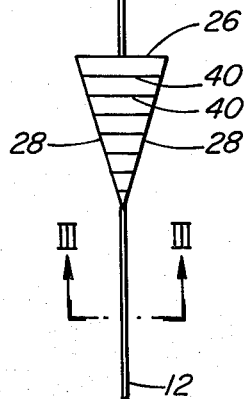
FIGS. 4 and 5 are cross-sectional views, on a smaller scale, through a concrete wall and showing the device in different stages of use.

The device is used to measure the depth and width of cracks in concrete walls of a manhole at spaced positions along each crack 42. At each location, as shown in FIG. 4, the strip 12 is pushed down into the crack until the base of the crack is reached. This operation is performed with the member 26 moved towards the handle so as not to interfere with entry of the strip 12 into the crack. The flexibility of the strip 12 enables it to negotiate any non-linear part of the crack. The depth of the crack is then read from the scale 24.

Figure 5:
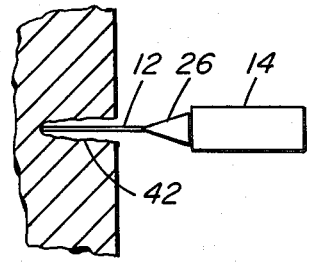

Then the width of the crack is measured at this position by moving the member 26 into the crack (FIG. 5) until the side edges 28 engage the sides of the cracks. At this position of engagement, the width of the crack is then measured by reading from the lines 40.

In the above way, the depth and width of each crack may be measured in a substantially accurate manner at various positions, thereby enabling an engineer to judge the strength and stability of the manhole wall and hence to determine what steps are necessary to repair the wall and make it safe.

As may be seen, the above device is simple of construction and is inexpensive. It is also a reliable means for determining the extent of cracks in manhole walls upon which an engineer may depend when determining the state of the manhole structure.

What is claimed is:

1. A device for simultaneously measuring the depth and width of a space comprising an elongate depth measuring member having a distance measuring scale provided along its length to record distances from one end of the elongate member, and a width measuring member mounted upon the depth measuring member for movement along the depth measuring member in positions spaced from said one end, the width measuring member having surfaces which extend generally in the direction of the length of the elongate member and diverge as they extend away from said one end of the depth measuring member and with the depth measuring member lying within the confines of the diverging surfaces, the width measuring member having a distance measuring scale which indicates, at spaced positions, the distance apart of the diverging surfaces at each of the spaced positions.

2. A device according to claim 1 wherein said width measuring member comprises a plate with side edges forming its diverging surfaces.

3. A device according to claim 2 wherein the depth measuring member is in the form of a flat strip and the width measuring member is mounted upon the flat strip.

4. A device according to claim 3 wherein the flat strip is formed with a longitudinal slot and said width measuring member has mounting means received through the slot and by which the members are relatively moveable, one upon the other.

5. A device for simultaneously measuring the depth and width of a space comprising a handle, an elongate depth measuring member in the form of a flat strip extending from the handle and having a distance measuring scale provided along its length to record distances from one end of the strip, and a width measuring member, said width measuring member mounted upon the strip for movement along the strip in positions spaced from said one end, the width measuring member having side edges extending generally in the direction of the length of the strip and diverging as they extend away from said one end of the strip and with the depth measuring member lying between the confines of the diverging side edges, the width measuring member having a distance measuring scale which indicates, at spaced positions, the distance apart of the diverging surfaces at each of the spaced positions.

6. A device according to claim 5 wherein each member is planar and said width measuring member is mounted to move along one side edge of the strip.

* * * * *